Figure 1:
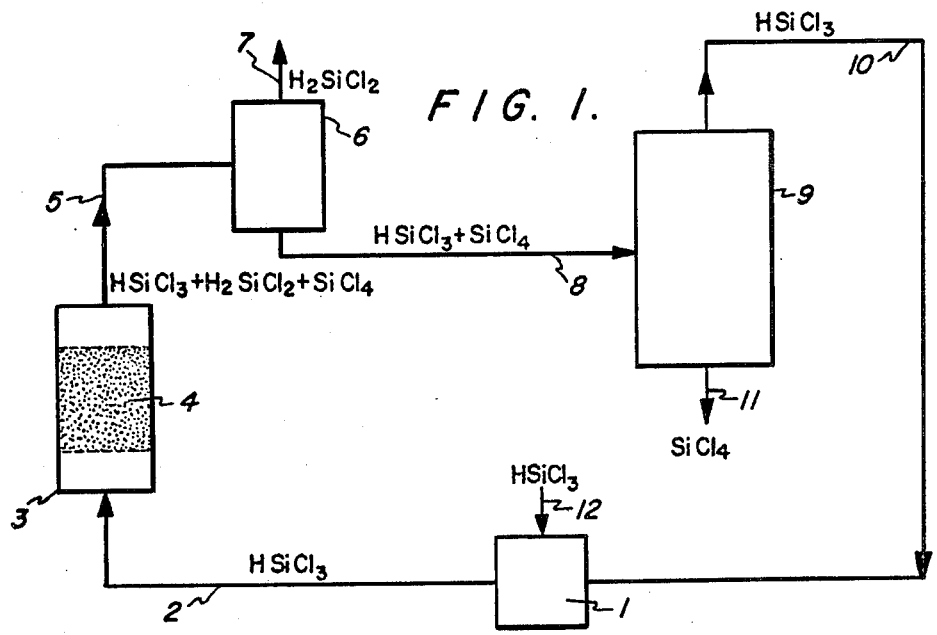

United States Patent [19]  [11] 4,113,845
Litteral  [45] Sep. 12, 1978

[54] DISPROPORTIONATION OF CHLOROSILANE

[75] Inventor: Carl J. Litteral, Newport, Ohio

[73] Assignee: Union Carbide Corporation, New York, N.Y.

[21] Appl. No.: 724,919

[22] Filed: Sep. 20, 1976

Related U.S. Application Data

[63] Continuation of Ser. No. 152,587, Jun. 14, 1971, abandoned, which is a continuation-in-part of Ser. No. 9,987, Dec. 17, 1970, abandoned.

[51] Int. Cl.² .................... C01B 33/08; C01B 33/04
[52] U.S. Cl. .................................. 423/342; 423/347
[58] Field of Search .............................. 423/342, 347

[56] References Cited

U.S. PATENT DOCUMENTS

| | | | |
|---|---|---|---|
| 2,834,648 | 5/1958 | Bailey et al. | 423/342 |
| 3,037,052 | 5/1962 | Bortnick | 260/485 |
| 3,367,889 | 2/1968 | Oline | 260/2.2 R X |

*Primary Examiner*—Jack Cooper
*Attorney, Agent, or Firm*—Bernard Lieberman

[57] ABSTRACT

Process for the disproportionation of a chlorosilicon hydride which comprises contacting it with an ion exchange resin containing tertiary amino or quaternary ammonium group bonded therein. There is described a cyclic process in which a fixed bed of the resin may be employed.

3 Claims, 3 Drawing Figures

DISPROPORTIONATION OF CHLOROSILANE

This application is a continuation of our prior U.S. application Ser. No. 152,587 filed June 14, 1971 and which is a continuation-in-part of application 009,987 filed Dec. 17, 1970, both now abandoned.

This invention relates to the disproportionation of chlorosilanes to produce more reduced silicon compounds.

A number of processes have been described in the art for disproportionating chlorosilanes to more reduced silanes. For a number of reasons, these processes suffer from a plurality of deficiencies. For example, a very few of the prior art processes provide reasonably decent rates of disproportionation. Some require undesirably high temperatures. Still others employ costly disproportionation catalysts, while others require high concentrations of catalyst. A number require the use of highly corrosive acidic or basic materials, i.e., that are corrosive with respect to reaction equipment. Practically, if not all, of such prior art processes require expensive and time consuming separation of the catalyst from the reaction mixture. This is a major factor, along with rate of disproportionation, in determining what portion processing contributes to the ultimate cost of the reduced silanes.

The disproportionation of chlorosilanes is known. It is an equilibrium reaction. For example, in the disproportionation of trichlorosilane to dichlorosilane the reaction proceeds in the following manner:

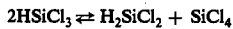

$$2HSiCl_3 \rightleftharpoons H_2SiCl_2 + SiCl_4$$

The ultimate amount of trichlorosilane which is converted to dichlorosilane and silicon tetrachloride is about 10 – 15 mole percent when the equilibrium reaction is left to stand until balanced out. Since the boiling point of dichlorosilane is far below that of silicon tetrachloride and trichlorosilane, the reaction can be shifted continually to the right, favoring continuing disproportionation, by the periodic or continuous removal of dichlorosilane by distillation. It is thus apparent that the effectiveness of the disproportionation reaction is dependent upon the rate thereof, which determines the amount of the more reduced silanes produced in a given period of time, and the frequency that the reaction mixture must be replenished in order to remove excess silicon tetrachloride that builds up in the reaction mixture, to remove spent catalyst and introduce fresh catalyst.

This invention relates to a catalytic process of disproportionating a chlorosilicon hydride monomer feed to produce an equilibrium mixture containing monomers more reduced, that is, containing more hydrogen bonded to silicon, than the feed, where catalyst removal is not necessary and when done, the reaction mixture is not affected; where the products of the equilibrium reaction are separated from the monomer feed and optionally from each other in a zone which can be removed from the zone in which catalyst equilibrium takes place; where the disproportionating reaction can be operated as a continuous process providing maximum conversion of starting material by recycling procedures.

This invention relates to the disproportionation of trichlorosilane, dichlorosilane and/or monochlorosilane, alone or in admixture, while in contact with a solid anionic ion exchange resin. More particularly, and more desirably, this invention relates to the disproportionation of such silanes by contacting them with a solid amino ion exchange resin, and separating the resulting desired reduced silane(s) from the partial or complete equilibrium mixture so produced.

A particularly preferred embodiment of this invention involves the passage of trichlorosilane through a fixed bed of the solid amino ion exchange resin, with consequent recovery of the disproportioned products, followed by separation of the desired dichlorosilane from such products.

Another particularly preferred embodiment of this invention involves the passage of dichlorosilane through a fix bed of the solid amino ion exchange resin, with consequent recovery of the disproportionated products, followed by the separation of the desired reduced specie of such disproportionation from such products.

Another particularly preferred embodiment of this invention involves the passage of monochlorosilane through a fix bed of the solid amino ion exchange resin, with consequent recovery of the disproportionated products, followed by the separation of the desired reduced specie of such disproportionation from such products.

A further embodiment of this invention is an extension of the preceeding embodiments, and it involves separating each of the more oxidized silicon monomers of the disproportionation reaction from the chlorosilicon hydride monomer employed as the feed material, followed by recycle of the chlorosilicon hydride monomer feed material to the fixed bed. In this embodiment, make up of such feed material is also fed to the bed when necessary. This can be a continuous process by the continuous operation of each of the process steps.

The amino ion exchange resins suitable for use in the practice of this invention are polymeric materials which are insoluble in silane, monochlorosilane, dichlorosilane, trichlorosilane, and silicon tetrachloride.

Such insolubility can be achieved, in the case of linear, thermoplastic ion exchange resins, by using a resin of sufficiently high molecular weight, viz. greater than about 10,000 such that the polymers possess the requisite insolubility. Insolubility can be achieved by employing a cross-linked ion exchange resin, such as one which is infusible as well. However, for the purposes of this invention, the degree of cross-linking need only be sufficient to meet the requisite insolubility requirements.

The amino functionality in the resin is preferably a tertiary amino or quaternary ammonium group attached through carbon to the resin structure. Preferably, other than the nitrogen atoms or the halide ions of the amino functionality all of the resin is composed of carbon and hydrogen. However, this limitation does not exclude the presence of impurities in the resin which contain other atoms such as oxygen, phosphorus, iron, boron and the like. During the course of the reaction, it is believed that such impurities are leached to a substantial degree from the resin by passage of chlorosilicon hydride monomer through the resin thereby to produce a resin free of such impurities or the resin retains such impurities without contaminating the feed or reaction products.

Particularly preferred ion exchange resins are those made from the copolymerization of a monoolefinically unsaturated (halogenated or non-halogenated) hydrocarbons or a monoolefinically unsaturated heteroamine and a polyolefinically unsaturated hydrocarbon or polyolefinically unsaturated heteroamine. Illustrative of such monoolefinically unsaturated compounds are, for example, styrene, 4-chlorostyrene, 3-chlorostyrene, vinyltoluene, 4-chloromethylstyrene, vinylnaphthalene, vinylpyridine, 2-methyl-5-vinylpyridine, 2,3-dimethyl-5-vinylpyridine, 2-methyl-3-ethyl-5-vinylpyridine, 2-methyl-5-vinylquinoline, 4-methyl-4-vinylquinoline, 1-methyl- or 3-methyl-5-vinylisoquinoline, and the like.

The polyolefinically unsaturated compounds may be, for example, one of the following: 1,4-divinylbenzene, divinylpyridine, divinyltoluenes, divinylnaphthalenes, trivinylbenzene, trivinylnaphthalenes, and the polyvinylanthracenes.

Such copolymers are well known and a number of them are commercial products which possess amino functionality. They may be converted into cross-linked resins with conventional free radical addition catalysts such as peroxides. If the monomers employed contain tertiary amino groups, such as is the case with the pyridinyl compounds mentioned above, then it is not necessary to treat the copolymer to introduce the amino functionality. However, if the copolymer contains chloro groups (and is free of amine) then the amine can be formed by reacting the copolymer with, for example, ammonia, primary and secondary alkyl and/or aryl amines, to form the amine by condensation, where the by-product is HCl. In the preferred practice of this invention, the amine formed in this manner is the reaction product of a secondary amine, such as a dialkylamine, a diarylamine and/or an alkylarylamine, and the chlorinated resin.

Quaternization of the tertiary amine containing resin can be effected by reaction with a hydrocarbon halide such as an alkyl halide or aryl halide, to form the corresponding quaternary amine halide.

Amine anion exchange resins are available generally in two forms. One form is called a gel type resin and represents the standard type exchangers. The other form is called a macroreticular type anion exchange resin. The latter form possesses, within the particles, greater porosity for the passage of molecules. The gel type resins possess collapsed gel structures whereas the macroreticular resins possess a non-gel pore structure that is not collapsed. Such forms of the resins have been thoroughly described in the published literature, see, for example, JACS, vol 84, Jan. 20, 1962 at pages 305 and 306; *I & EC Product Research and Development*, vol 1, No. 2, June 1962, at pages 140–144; *Polymer Letters* (1964) vol. 2, at pages 587–591; U.S. Pat. No. 3,037,052, patented May 29, 1962; and U.S. Pat. No. 3,367,889, patented Feb. 6, 1968. The latter patent is particularly pertinent with respect to the processes for producing a macroreticular tertiary amine ion exchange resin, see specifically Example IV therein.

Illustrative of a commercial macroreticular tertiary amine ion exchange resin is Amberlyst A-21, a trademark owned by, and which resin is produced by, Rohm and Haas Company, Philadelphia, Pa. It has the following physical properties:

| Appearance | Hard, spherical, light tan Water-saturated beads |
| --- | --- |
| Ionic form | Free base |
| Moisture holding capacity, percent | 45 to 53 |
| Exchange capacity: | |
| Weight capacity, meq./g. dry resin | 4.7 to 5.0 |
| Volume capacity, meq./ml. | 1.5 to 1.7 |
| Density, lbs./cu. ft. | 38 to 42 |

-continued

| | |
| --- | --- |
| Effective size, mm. | 0.40 to 0.55 |
| Uniformity coefficient | 2.0 maximum |
| Fines, by wet sieve analysis through #50 sieve, percent | 1.0 maximum |
| Hydraulic expansion, free base form at 2.0 gpm/cu. ft., 30° C, percent | 120 maximum |
| Whole bead content, percent | 100 |
| Porosity, percent | 35 to 45 |
| Average pore diameter A | 700 to 1200 |
| Surface area, m. /g. | 20 to 30 |
| Solids percent | 47 to 55 |
| Percent swelling from dry state to solvent-saturated state- | |
| Hexane | 20 |
| Toluene | 25 |
| Diethylether | 22 |
| Acetone | 22 |
| Absolute ethanol | 30 |
| Water | 25 |

These data were obtained using free base form resin previously conditioned for irreversible swelling by a two cycle alternate acid-caustic rinse treatment. Such swelling may amount to 10 to 15 percent.

Illustrative of a commercial macroreticular quaternary amine ion exchange resin is Amberlyst A-26 a trademark owned by, and which resin is produced by, Rohm and Haas Company, Philadelphia, Pa. It has the following physical properties:

| Appearance | Hard, spherical, light tan, water-saturated beads |
| --- | --- |
| Functional group | Quaternary Ammonium |
| Ionic form | Chloride |
| Moisture holding capacity, % | 61–65 |
| Ion exchange capacity: | |
| Weight capacity, meq./g | 4.1–4.4 |
| Weight capacity, meq./ml. | 0.95–1.1 |
| Density, lbs/ft.$^3$ | 39–43 |
| Effective size, mm. | 0.45–0.55 |
| Uniformity coefficient | 1.8 maximum |
| Whole bead content, % | 100 |
| Average pore diameter A | 400–700 |
| Surface area, m$^2$/g. | 25–30 |

Illustrative of a commercial gel type quaternary ammonium ion exchange resin is Amberlite IRA-400, a trademark owned by, and which resin is produced by, Rohm and Haas Company, Philadelphia, Pa. It has the following physical properties:

| Appearance | Hard, spherical, dark tan water saturated beads |
| --- | --- |
| Ionic form | Quaternary amine hydrochloride |
| Moisture Holding Capacity, % | 42–48 |
| Exchange Capacity | |
| Wt. Capacity, meq./g. dry resin | 3.8 |
| Volume Capacity, meq./ml. | 1.4 |
| Density, lbs/cu. ft. | 38.0–45 |
| Effective size, mm | 0.38–0.45 |
| Uniformity Coefficient | 1.75 (max.) |
| Fines, by wet sieve analysis through #50 sieve (U.S. Standard), percent | <2.0 (max.) |
| Whole bead content, percent | 100 |
| mean pore diameter, Angstroms | none |
| Swelling, conversion from chloride to hydroxide form, % | 18–22 |

The aforementioned resins are predicated upon styrene and divinylbenzene copolymers which are chloromethylated on the styrene ring followed by amination to produce the desired amine exchange functionality. Further alkylation as described above can be employed to produce the corresponding quaternary ammonium derivatives.

In the most desirable practice of this invention, the tertiary amine or quaternary ammonium groups are dialkyl amino, or alkyl phenyl or diphenyl or dicycloalkyl or alkylcycloalkyl, or further alkylated derivatives of the above to the quaternary derivative, where each alkyl contains one to about 18 carbon atoms and the cycloalkyl contains about 4 to about 8 carbon atoms. The most preferred tertiary amino or quaternary ammonium functional groups are those which are the alkylamino or alkylammonium wherein each alkyl thereof contains one to about 8 carbon atoms.

The above described resins are particulate and in this form can be employed to disproportionate the chlorosilicon hydride feed monomers as a slurried mass of the particles in the monomers or by passing liquid or vapors of such monomers through a bed of such particles.

The disproportionation process may be practiced at temperatures as low as about 0° C. to as high as about 350° C., though the preferred operating temperatures are typically about 20° C. to about 200° C.

The process of this invention, as characterized above, can be carried out as a liquid phase process or as a vapor phase process. In the usual practice of this invention, when the process is carried out in the vapor phase, the rate of the disproportionation is accelerated by a substantial degree, as much as 10 times and more. Surprisingly, the maximum equilibrium that one can achieve by such disproportionation reactions is attained more rapidly in a vapor phase disproportionation reaction as compared to a liquid phase reaction. Hence for commercial utilization of this process, a vapor phase reaction will probably be preferred.

The process may be carried out under subatmospheric, atmospheric or superatmospheric pressure. Pressure plays a practical role in the utilization of this process as a mechanism for controlling the state of the feed material and disproportionation products during conduct of the reaction. It is not, however, a critical factor to the operability of this process. For example, if one wishes to operate the process at 60° C. and in the liquid phase rather than the vapor or gas phase, certain considerations must be made. For example, at 60° C., silane, monochlorosilane, trichlorosilane, dichlorosilane, and silicon tetrachloride are vaporized at atmospheric pressure and therefore pressure must be applied in order to maintain a liquid phase process in which these materials are present. However, the term "liquid phase process" does not mean that all of the products of the disproportionation reaction and the monomer feed are in the liquid phase. All that is necessary for a liquid phase reaction is that at least one of such products be liquid under conditions of operation.

Another element of the process is the "contact time" or rather the "residence time" between the resin and the chlorosilicon hydride monomer feed materials. For each temperature employed, there is an independent period of time in which such monomer feed should be in contact with the anion exchange resin to reach ultimate equilibrium. The mole percent of the desired or favored disproportionated product is dependent upon the process temperature, where higher temperatures generally yield higher mole percent quantities of such product, and the contact time. However if it is desired to achieve partial disproportionation and hence achieve less than the equilibrium of such disproportionation, then a shorter contact time will be favored.

Figure 2:
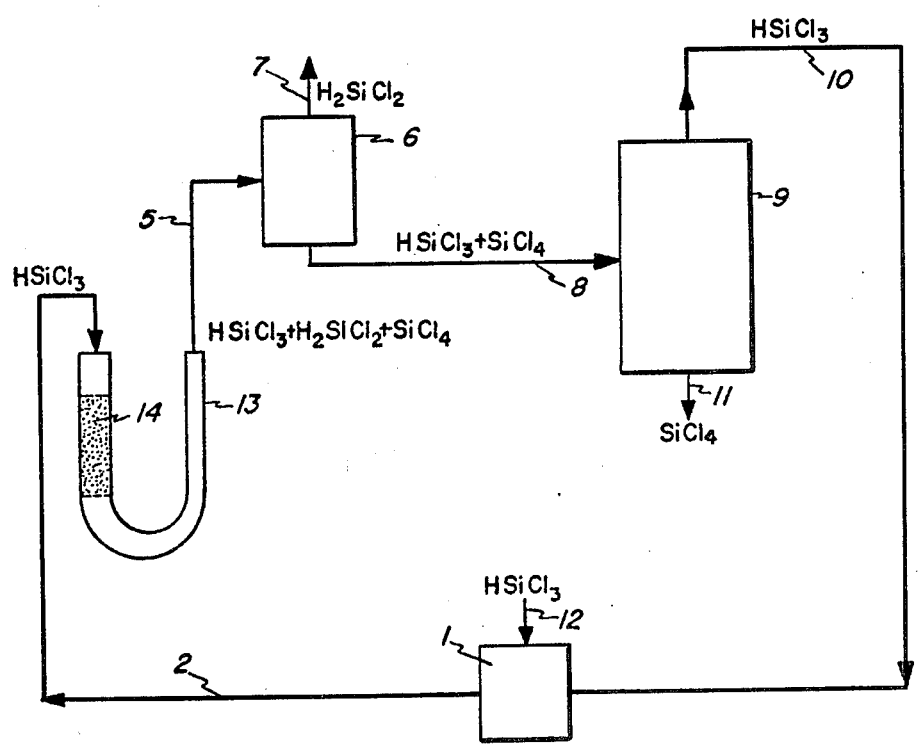
Figure 3:
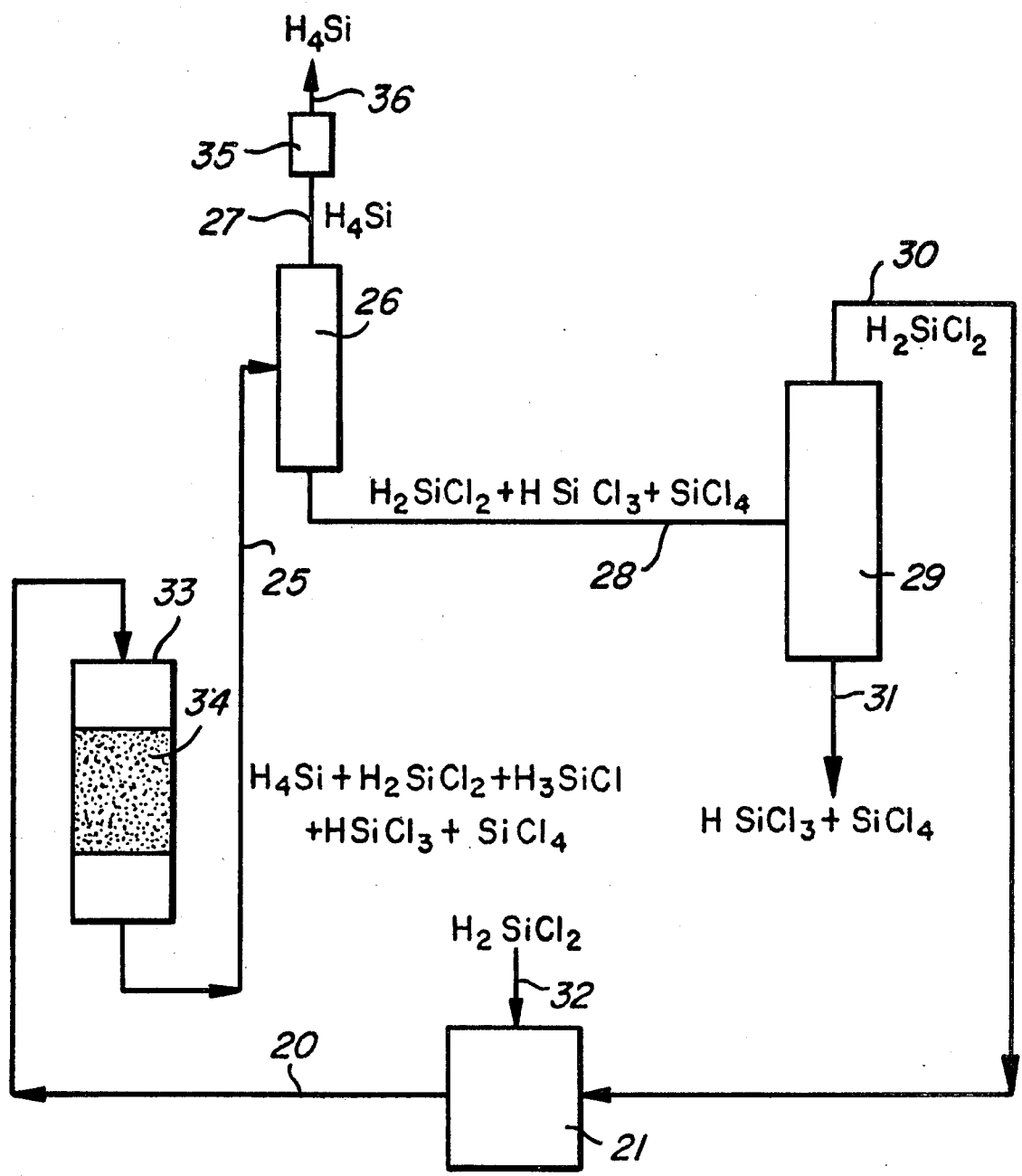

In order to provide additional appreciation of the advantages of this invention, reference is made to the drawings where there are depicted in FIGS. 1, 2 and 3 schematic illustrations of continuous processes for disproportionating chlorosilicon hydrides.

FIGS. 1 and 2 are directed to the disproportionation of trichlorosilane to make as the preferred product dichlorosilane whereas FIG. 3 is directed to disproportionating dichlorosilane to produce more reduced species such as silane.

With respect to FIG. 1, $HSiCl_3$ is fed to holding tank 1 from line 12 to fill tank 1 and supply sufficient $HSiCl_3$ to fill line 2, reaction column 3 (which contains a fixed bed of tertiary amine ion exchange resin 4 held in position by one or more porous plates, not shown), product effluent line 5 (containing $HSiCl_3$, $H_2SiCl_2$ and $SiCl_4$), line 8 (containing a mixture of $HSiCl_3$ and $SiCl_4$ removed from the product effluent by distillation in distillation column 6) and $HSiCl_3$ recycle line 10 (containing the $HSiCl_3$ distilled from the line 8 $SiCl_4$-$HSiCl_3$ mixture in distillation column 9). Once the piping (the various lines depicted in FIG. 1) are filled, $HSiCl_3$ is periodically added, either in periodic increments or continuously through line 12 to tank 1 in amounts to make up for the $HSiCl_3$ disproportionated to $H_2SiCl_2$ and $SiCl_4$. Reaction column 3 and the distillation columns may be externally heated by heating jackets placed thereabouts, and/or by internal heaters, and/or the temperatures within each may be controlled by heating each of the lines bring materials to each column so as to provide the materials within each column at the desired temperature.

FIG. 2 differs from FIG. 1 in only one respect. In FIG. 2, the reaction column 13 employs gravity flow of the $HSiCl_3$ fed from line 2 through the ion exchange resin bed 14. The disproportionated product is then removed from the upward arm or leg of column 13 into line 5.

With respect to both FIGS. 1 and 2, distilled $H_2SiCl_2$ is removed from distillation column 6, through line 7 and recovered, while $SiCl_4$ is recovered as the residue from distillation column 9 from line 11.

With respect to FIG. 3, dichlorosilane is fed to holding tank 21 from line 32 to fill tank 21 and supply sufficient dichlorosilane to fill line 20, reaction column 33 (which contains a fixed bed of anion exchange resin 34 held in position by one or more porous plates, not shown), product effluent line 25 (containing silane, dichlorosilane, monochlorosilane, trichlorosilane and silicon tetrachloride), line 28 (containing a mixture of dichlorosilane, trichlorosilane and silicon tetrachloride removed from the product effluent by distillation in distillation column 26) and dichlorosilane recycle line 30 (containing the dichlorosilane distilled from the line 28 mixture of dichlorosilane, trichlorosilane and silicon tetrachloride mixture in distillation column 29). Once the piping (the various lines depicted in FIG. 3) are filled, dichlorosilane is periodically added, either in periodic increments or continuously through line 32 to tank 21 in amounts to make up for the dichlorosilane disproportionated to silane, trichlorosilane, monochlorosilane and silicon tetrachloride. Reaction column 33 and the distillation columns 26 and 29 may be externally heated by heating jackets placed thereabouts, and/or by internal heaters, and/or the temperatures within each may be controlled by heating each of the lines feeding materials to each column so as to provide the materials within each column at the desired temperature. Distillation column 26 is maintained at a temperature sufficient to only distill off the silane (below about −10° C.) and therefore is at a temperature which is preferably below the boiling point of monochlorosilane, dichlorosilane, trichlorosilane and silicon tetrachloride. The monochlorosilane formed in the reaction column 33 and fed to distillation column 26 via line 25 may also be distilled off with the silane through line 27. However, in that case, a separate distillation vessel (not shown) between column 26 and scrubber 35 will probably be desirable to separate silane from monochlorosilane. The monochlorosilane can be similarly disproportionated to produce more silane, and dichlorosilane, and trichlorosilane. Scrubber 35 is a water scrubber in which the impurities in silane are hydrolyzed and separated from silane. Silane is relatively insoluble in water, and by water scrubbing one can produce pure silane which is removed from line 36 after which it is collected in a cold trap below its boiling point. However, if the temperature of distillation column 26 is kept below the boiling point of monochlorosilane (below −10° C.), then the monochlorosilane contained in line 25 will be removed from distillation column 26 through line 28 in admixture with dichlorosilane, trichlorosilane and silicon tetrachloride. Thereafter, such a mixture is fed to distillation column 29 operated such as to remove the monochlorosilane as a separate and distinct product from the top of the column, the dichlorosilane product from a lower level in the column and the trichlorosilane and sillicon tetrachloride would constitute the lowest cut from the column, as indicated in FIG. 3.

In order to demonstrate details on the best mode known to practice this invention, reference is made to the following examples. It is not intended that this invention be limited by the examples.

EXAMPLE 1

A reactor designed for continuous flow redistribution at temperatures above the normal boiling point of the trichlorosilane feed was constructed from type 316 stainless steel. It consisted of a 500 cc feed tank pressurized to 26 p.s.i. gauge with nitrogen, connected to the bottom of a water-jacketted steel reactor of 22 cc. internal volume (1 centimeter by 20 centimeters in length) containing 12 grams of Amberlyst A-21 resin. The resin bed had been dried previously to 1–2 weight % of water, basis weight of the resin by passing boiling toluene through the resin and removing the toluene-water azeotrope. Flow in the reactor was controlled by a needle valve above the resin bed, and the effluent reaction product sampled immediately for analysis by gas-liquid chromatography. A dry-ice acetone condenser trapped any volatilized dichlorosilane.

Continuous operation of this reactor with 99.9 weight % pure trichlorosilane feed at a rate of 1.3 to 1.8 ml/minute, 58°–60° C. resin bed temperature, 26 p.s.i. gauge $N_2$ pressure, with a residence time (or contact time) of 5–8 minutes yielded a product containing 75–85 weight % of $HSiCl_3$, 6–9 weight % of $H_2SiCl_2$, 9–15 weight % of $SiCl_4$, and 0.01 to 0.4% weight % of $H_3SiCl$. After an initiation time of 3–4 hours crude product composition was essentially constant over 85 hours and 750 bed volumes of operation, with no sign of deterioration of performance at the end of the run.

EXAMPLE 2

A laboratory glass reactor similar in all respects to that in Example 1 was used to determine the effect of different bed temperatures on the redistribution reaction at a given residence (contact) time. In experiments at four different residence times, the percentage of $H_2SiCl_2$ in the product was found to increase with increasing resin bed temperature. The results are presented in the table which follows:

| Exp. No. | Residence Time | Bed Temp. | Composition, wt. % $HSiCl_3$ | $H_2SiCl_2$ | $SiCl_4$ |
|---|---|---|---|---|---|
| 1 | 10 min. | 1° C. | 98.9 | 0.5 | 0.6 |
|   | 10 | 20° C. | 93.1 | 2.8 | 4.1 |
|   | 10 | 31° C. | 87.1 | 5.0 | 7.9 |
| 2 | 20 | 1° C. | 98.0 | 0.7 | 1.2 |
|   | 20 | 20° C. | 90.4 | 4.1 | 5.5 |
|   | 20 | 31° C. | 83.7 | 6.8 | 9.6 |
| 3 | 30 | 1° C | 96.1 | 1.7 | 2.1 |
|   | 30 | 20° C. | 87.7 | 5.1 | 7.1 |
|   | 30 | 31° C. | 80.3 | 7.8 | 11.5 |
| 4 | 60 | 20° C. | 83.7 | 6.3 | 9.8 |

EXAMPLE 3

A laboratory glass reactor for continuous flow redistribution at ambient pressures was used. It consisted of a 500 cc stainless steel feed tank pressurized to 26 p.s.i. gauge with nitrogen, immediately followed by a 5 micron stainless steel filter and a needle valve flow control, after which the feed was at ambient pressure. The feed monomer was then passed up through a 1 × 22 centimeter I.D. water-jacketted glass tube, filled with 12 grams of Amberlyst A-26 resin, dried as in Example 1. The effluent reaction product was sampled immediately for analysis by gas-liquid chromatography. A dry-ice acetone condenser trapped any volatilized low-boiling monomers.

Continuous operation of this glass reactor with 99.9 weight % pure trichlorosilane feed at a rate of 1.0 to 1.2 ml/min., ambient pressure, at 20° C. and a residence time of 10 minutes yielded a product containing 95.0 weight % $HSiCl_3$, 1.7 weight % $H_2SiCl_2$, and 3.3 weight % $SiCl_4$. The crude composition was essentially constant over 4–6 hours.

EXAMPLE 4

A laboratory glass reactor similar in all respects to that in Example 3 was filled with 12 grams of Amberlite IRA-400, dried as in Example 1.

Continuous operation of this reactor with 99.9 weight % pure trichlorosilane feed at 1.0 ml/min., ambient pressure at 25° C. and a residence time of 10 minutes yielded a product containing 98.5 weight % $HSiCl_3$, 0.2 weight % $H_2SiCl_2$, and 0.5 weight % $SiCl_4$, as well as small amounts of higher-boiling monomers.

EXAMPLE 5

A laboratory glass reactor similar in all respects to that in Example 3 was filled with 12 grams of a benzyl dibutylamino ion exchange resin. This was a macroporous tertiary amine styrene-divinylbenzene ion exchange resin structurally identical to the aforementioned A-21 type resin, but containing a dibutyl amino functionality rather than a dimethylamino functionality.

Continuous operation of this reactor with 99.9 weight % trichlorosilane feed at 1.0 ml/min., ambient pressure at 25° C. and 11 minutes contact time gave a product containing 94.4 weight % $HSiCl_3$, 2.1 weight % $H_2SiCl_2$ and 4.2 weight % $SiCl_4$.

EXAMPLE 6

Liquid trichlorosilane of 99.9 weight % purity was brought to boiling at atmospheric pressure, the vapors passed through a water-jacketted spiral glass preheater, and finally up through a water-jacketted 1 × 15 cm. I.D. glass tube containing 7 grams of Amberlyst A-21 resin, dried as in Example 1. The effluent product vapors were condensed by a dry-ice acetone trap, and sampled immediately for analysis by gas liquid chromatography.

The vapor contact time was calculated by weighing the grams of condensed product per unit time, and converting to vapor volume. The vapor flow rate was varied by changing the vapor boiling rate and bed temperature by changing preheater and reactor jacket temperatures.

Continuous operation of this reactor at ambient pressure, different residence (contact) times, and bed temperatures from 40° to 150° C. gave the results presented in the table which follows:

| Exp. No. | Residence Time | Bed Temp. | Crude Composition Mole % | | |
|---|---|---|---|---|---|
| | | | $HSiCl_3$ | $H_2SiCl_2$ | $SiCl_4$ |
| 1 | 0.63 sec. | 40° C. | 87.8 | 5.4 | 6.8 |
| 2 | 0.24 | 60° | 88.6 | 5.3 | 6.1 |
| 3 | 0.25 | 80° | 85.2 | 6.7 | 8.1 |
| 4 | 0.26 | 125° | 82.6 | 7.5 | 9.9 |
| 5 | 0.31 | 150° | 86.9 | 8.7 | 4.4 |

EXAMPLE 7

In a glass apparatus similar in all respects to Example 6, a mixture of 26 mole % $SiCl_4$ and 74 mole % $HSiCl_3$ was brought to boiling, and approximately 50 volume % hydrogen gas added to the vapors. This mixture of chlorosilanes and hydrogen was then preheated, passed through the resin bed, condensed and analyzed as in Example 6.

In experiments at 3–5 seconds contact time, 75°–80° C. and ambient pressure, the redistribution of trichlorosilane was not markedly affected by the presence of hydrogen and $SiCl_4$, as shown in the following table:

| Exp. No. | Vapor C.T. | Bed Temp. | Feed Composition | Product Composition |
|---|---|---|---|---|
| 1 | 5 sec. | 75° C. | 50 vol. % $H_2$ 50 vol. % chlorosilanes: 89.3 mole % $HSiCl_3$ 10.6 mole % $SiCl_4$ | 50 vol. % $H_2$ 50 vol. % chlorosilanes: 75.4 mole % $HSiCl_3$ 17.6 mole % $SiCl_4$ 7.0 mole % $H_2SiCl_2$ |
| 2 | 3 sec. | 81° C. | 50 vol. % $H_2$ 50 vol. % chlorosilanes: 81.9 mole % $HSiCl_3$ 18.1 mole % $SiCl_4$ | 50 vol. % $H_2$ 50 vol. % chlorosilanes: 71.4 mole % $HSiCl_3$ 23.9 mole % $SiCl_4$ 4.7 mole % $H_2SiCl_2$ |

EXAMPLE 8

Dichlorosilane gas of 97 weight % purity was passed at ambient pressure up through a water-jacketted steel reactor with internal dimensions of 1 × 22 cm., which had previously been filled with 12 grams of Amberlyst A-21 resin, dried as in Example 1. The effluent vapors from the reactor were sampled immediately in a glass syringe for analysis by gas chromatography.

Continuous operation of this reactor with 97 weight % pure dichlorosilane at a feed rate of 125 to 1200 cc/minute, atmospheric pressure, 60° C., and 0.2–2 seconds vapor contact time gave a mixture of silane and chlorosilanes in the crude product gas. The results are presented in the table which follows:

| Exp. No. | Residence Time | Bed Temp. | Crude Composition Mole % | | | | | |
|---|---|---|---|---|---|---|---|---|
| | | | HCl | $SiH_4$ | $H_3SiCl$ | $H_2SiCl_2$ | $HSiCl_3$ | $SiCl_4$ |
| 1 | 0.24 sec. | 60° C. | 4.8 | 10.5 | 25.7 | 39.5 | 19.5 | — |
| 2 | 0.73 | 60° C. | 5.7 | 20.6 | 15.3 | 30.3 | 27.9 | 0.1 |
| 3 | 1.3 | 60° C. | 8.3 | 26.1 | 13.3 | 27.9 | 23.7 | 0.2 |
| 4 | 2.1 | 60° C. | 6.1 | 23.4 | 14.6 | 28.8 | 26.8 | 0.4 |

The processes described herein may be combined into a complex continuous process for the manufacture of silane, monochlorosilane and dichlorosilane using trichlorosilane as the initial feed material. Thus the process of FIGS. 1 or 2 can be employed to make dichlorosilane and the process of FIG. 3 can be used to make $SiH_4$ and $SiH_3Cl$ from dichlorosilane. If the desired product is $SiH_4$, then $SiH_3Cl$ can be disproportionated in an anion exchange resin, as described above, to produce more silane, and the by-products $HSiCl_3$ and $H_2SiCl_3$ can be recycled back into the respective ion exchange columns in which they constitute feed materials. In this fashion one can optimize the production of any one of the silicon hydride end-products.

What is claimed is:

1. The cyclic continuous process for the disporportionation of one or more of trichlorosilane, dichlorosilane and monochlorosilane which comprises continually feeding such chlorosilane to a water-dried fixed bed of a divinylbenzene-styrene copolymer based macroreticulated anion exchange resin containing tertiary amino or quaternary ammonium groups thereof in the chloride ionic form, said groups being bonded to the resin through carbon, which resin is insoluble in silane, monochlorosilane, dichlorosilane, trichlorosilane and silicon tetrachloride, and is maintained at a temperature of between 0.° C. to 350° C. for a period of time whereby there is formed in the bed a silane containing less chlorine than is contained in the chlorosilane fed to the bed and there is also formed a silane containing more chlorine than the chlorosilane fed to the bed, at least a portion of said silanes formed by disproportionation in the bed are removed therefrom and at least a portion thereof are separated each from the other and each is recovered and the chlorosilane feed which is not disproportionated is recycled to the fixed bed.

2. The process of claim 1 wherein the feed to the bed is trichlorosilane and the disproportionated products include dichlorosilane and silicon tetrachloride.

3. The process of claim 1 wherein the disproportionated products contain silane and silicon tetrachloride.

* * * * *

REEXAMINATION CERTIFICATE (155th)

United States Patent [19]
Litteral

[11] B1 4,113,845

[45] Certificate Issued Jan. 24, 1984

[54] DISPROPORTIONATION OF CHLOROSILANE

[75] Inventor: Carl J. Litteral, Newport, Ohio

[73] Assignee: Union Carbide Corporation, New York, N.Y.

Reexamination Request:
No. 90/000,360, Apr. 18, 1983

Reexamination Certificate for:
Patent No.: 4,113,845
Issued: Sep. 12, 1978
Appl. No.: 724,919
Filed: Sep. 20, 1976

Related U.S. Application Data

[63] Continuation of Ser. No. 152,587, Jun. 14, 1971, abandoned, which is a continuation-in-part of Ser. No. 99,087, Dec. 17, 1970, abandoned.

[51] Int. Cl.$^3$ .................... C01B 33/08; C01B 33/04

[52] U.S. Cl. ..................... 423/342; 423/341; 423/347

[58] Field of Search .............. 423/342, 347, 341

[56] References Cited

U.S. PATENT DOCUMENTS

3,399,222  8/1968  Weyenberg ............. 260/448.2

OTHER PUBLICATIONS

*J. Organometal. Chem.* 3 (1965) pp. 489–492 by Weyenberg et al "The Tetraalkylammoniumhalide Catalyzed Redistribution of Hydrogen and Chlorine on Silicon".

*Primary Examiner*—Jack Cooper
*Attorney, Agent, or Firm*—Paul W. Leuzzi, II

[57] ABSTRACT

Process for the disproportionation of a chlorosilicon hydride which comprises contacting it with an ion exchange resin containing tertiary amino or quaternary ammonium group bonded therein. There is described a cyclic process in which a fixed bed of the resin may be employed.

REEXAMINATION CERTIFICATE ISSUED UNDER 35 U.S.C. 307.

DISPROPORTIONATION OF CHLOROSILANE

NO AMENDMENTS HAVE BEEN MADE TO THE PATENT.

AS A RESULT OF REEXAMINATION, IT HAS BEEN DETERMINED THAT:

The patentability of claims 1–3 is confirmed.

* * * * *